United States Patent [19]
Dickrell et al.

[11] Patent Number: 5,857,159
[45] Date of Patent: *Jan. 5, 1999

[54] DATA RECORDING AND DISPLAY SYSTEM

[75] Inventors: David L. Dickrell, Chillicothe; Gregory S. Gauger, Pekin; Robert W. Keene, Peoria; Ronald J. Mearek, Peoria; Richard D. Rathe, Peoria; Brian T. Rolli, Peoria; Thomas R. Sandborg, Mapleton; Greg A. Schumacher, Washington; Scott G. Sinn, Morton; Michael R. Verheyen, Dunlap, all of Ill.

[73] Assignee: Caterpillar Inc., Peroria, Ill.

[ * ] Notice: The term of this patent shall not extend beyond the expiration date of Pat. No. 5,600,558.

[21] Appl. No.: 289,593

[22] Filed: Aug. 12, 1994

[51] Int. Cl.$^6$ .............................. G06F 7/00; G06F 19/00
[52] U.S. Cl. .............................. 701/35; 701/29; 340/439
[58] Field of Search .................................. 701/29, 30, 31, 701/33, 34, 35; 340/438, 439; 364/550, 551.01

[56] References Cited

U.S. PATENT DOCUMENTS

| 3,828,742 | 8/1974 | Weis | 123/102 |
|---|---|---|---|
| 4,368,705 | 1/1983 | Stevenson et al. | 123/357 |
| 4,521,885 | 6/1985 | Melocik et al. | 371/29 |
| 4,608,638 | 8/1986 | Tsikos | 701/35 |
| 4,613,939 | 9/1986 | Paine | 364/424 |
| 4,853,856 | 8/1989 | Hanway | 701/35 |
| 4,858,133 | 8/1989 | Tekeuchi et al. | 701/35 |
| 4,926,331 | 5/1990 | Windle et al. | 701/35 |
| 4,939,652 | 7/1990 | Steiner | 701/35 |
| 4,949,263 | 8/1990 | Jurca | 701/35 |
| 4,987,541 | 1/1991 | Levente et al. | 701/35 |
| 5,033,010 | 7/1991 | Lawrence et al. | 701/35 |
| 5,173,856 | 12/1992 | Purnell et al. | 701/35 |
| 5,305,216 | 4/1994 | Okura et al. | 701/35 |
| 5,305,219 | 4/1994 | Ishibashi et al. | 701/35 |
| 5,311,430 | 5/1994 | Ishigami | 701/35 |
| 5,325,082 | 6/1994 | Rodriguez | 701/35 |
| 5,350,076 | 9/1994 | Kalan | 701/35 |
| 5,446,659 | 8/1995 | Yamawaki | 701/35 |
| 5,450,321 | 9/1995 | Crane | 701/35 |
| 5,479,350 | 12/1995 | Barakchi et al. | 701/35 |
| 5,600,558 | 2/1997 | Mearek et al. | 701/35 |
| 5,642,284 | 6/1997 | Parupalli et al. | 701/30 |

OTHER PUBLICATIONS

US Application No. 08/162,820, filed Dec. 3, 1993, "Adaptive Vehicle Display", Jaberi et al., Docket no. 90–300.5.

US Application No. 08/289,469, filed Aug. 12, 1994, "Data Histogram Recording and Display System", Keene et al., Docket No. 93–471.

US Application No. 08/289,470, filed Aug. 12, 1994, "Data Exception Reporting System", Mearek et al., Docket No. 93–474.

US Application No. 08/289,592, filed Aug. 12, 1994, "Maintenance Monitor System", Parupalli et al., Docket No. 93–475.

US Application No. 08/289,591, filed Aug. 12, 1994, "Diagnostic Data Reporting System", Mearek et al., Docket No. 93–476.

Primary Examiner—Jacques H. Louis-Jacques
Assistant Examiner—Gertrude Arthur
Attorney, Agent, or Firm—Stephen L. Noe

[57] ABSTRACT

A system is disclosed for sensing, recording, and selectively displaying data associated with operational characteristics of a vehicle and associated engine. The system includes a plurality of transducers delivering signals corresponding to such operational characteristics to a programmable logic device. These signals are converted to appropriate information signals which are stored in an associated storage device and can be selectively displayed on a suitable display device.

7 Claims, 10 Drawing Sheets

Fig_3_

Fig_4_

Fig_5_

Fig_b_

Fig_7_

Fig_8_

Fig_11_

Fig_12_

Fig_13_

DATA RECORDING AND DISPLAY SYSTEM

DESCRIPTION

1. Technical Field

This invention relates generally to an apparatus and method for controllably sensing, recording, and displaying data associated with a vehicle and associated engine and, more particularly, to an apparatus and method for controllably sensing, recording, and selectively displaying engine and vehicle operating parameters.

2. Background Art

Many vehicles and engines associated with vehicles in use today include computerized information and control systems. Such systems typically include a variety of sensors positioned about the vehicle and engine to sense various operating conditions and to develop corresponding electrical signals. These signals are delivered to a control computer or logic device where they are utilized in a controllable and programmable manner to affect the operation of the vehicle and associated engine. Such engine controls are relatively common in the case of modern vehicles, both on and off road.

Some of the electronic controls include the ability to store certain of the engine and vehicle related characteristics in a memory device. This stored information can be used both in the control of the vehicle and engine and for reference or diagnostic purposes. As fleets of vehicles are utilized in industry today, fleet managers require additional abilities to obtain information concerning the operation of each vehicle in the fleet. Furthermore, it is useful if repair facilities and manufacturers have access to information concerning the operating characteristics of a particular vehicle or associated engine.

The present invention is directed to overcoming one or more of the problems as set forth above.

DISCLOSURE OF THE INVENTION

In one aspect of the present invention a method is disclosed for controllably sensing, recording, and selectively displaying data associated with operational characteristics of a vehicle and associated engine. The vehicle and engine have a plurality of transducers respectively connectable to a programmable logic device and adapted to produce signals in response to engine and vehicle parameters. The programmable logic device has a storage device associated with it and a local display device connectable to the logic device. The method includes controllably manipulating the parameter signals to produce predetermined sets of information signals which are delivered to the storage device and individually accumulated during predetermined time periods.

In another aspect of the present invention an apparatus is disclosed for controllably sensing, recording, and selectively displaying data associated with a vehicle and associated engine. The apparatus includes a programmable logic device having a plurality of transducers respectively connectable to the vehicle and engine. Each of the transducers is adapted to produce parameter signals responsive to respective engine and vehicle parameters. A storage device and a display device are each connectable to the programmable logic device. The parameter signals are received by the logic device and controllably manipulated to produce first and second predetermined sets of information signals. The first set of information signals is delivered to the storage device and each signal is individually accumulated in the storage device during a first predetermined time period. Preselected ones of the second predetermined set of information signals are controllably delivered to the local display device. The parameter signals and the first predetermined set of information signals are optionally further selectively and controllably manipulated by the logic device to produce a third predetermined set of information signals. The third set of information signals is delivered to the storage device and each signal is individually accumulated in the storage device during a second predetermined period. The second predetermined period is a subset of the first predetermined period.

The present invention provides a data recording and display system that is advantageously responsive to a variety of engine and vehicle parameters and that stores information related to those parameters in such a way that it can be selectively and readily delivered to an operator or other interested user in a variety of useful manners.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
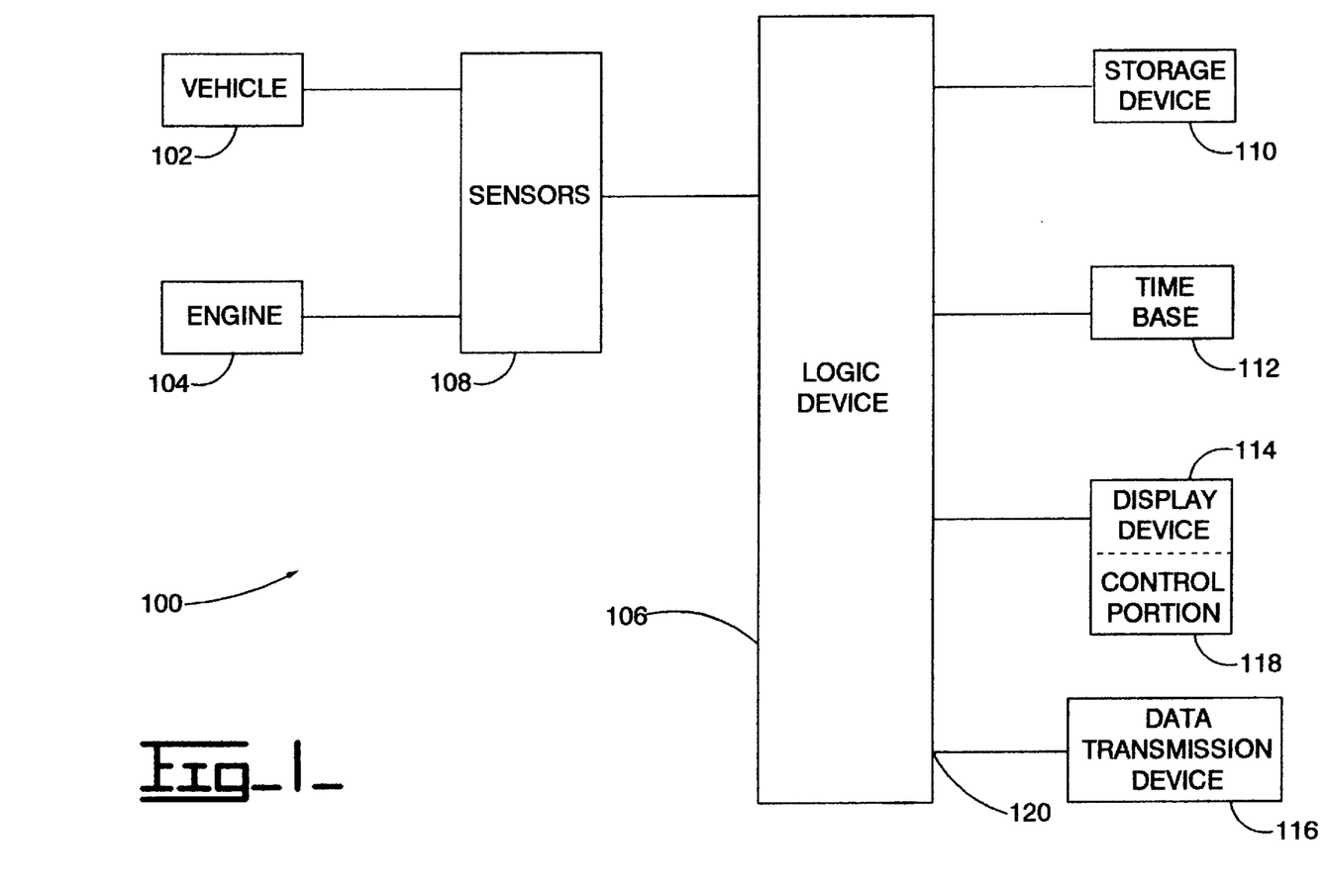
FIG. 1 is a block diagram of one embodiment of the present invention.

Referring first to FIG. 1, an apparatus embodying certain of the principles of the present invention is generally indicated by the reference numeral 100. It should be understood that the following detailed description relates to the best presently known embodiment of the apparatus 100. However, the apparatus 100 can assume numerous other embodiments, as will become apparent to those skilled in the art, without departing from the appended claims.

In FIG. 1, the apparatus 100 is adapted to controllably sense, record, and selectively display data associated with operational characteristics of a vehicle 102 and associated engine 104. The apparatus 100 includes a programmable logic device 106 and a plurality of transducers 108 respectively connectable to the programmable logic device 106. Each transducer 108 is adapted to produce parameter signals responsive to respective preselected engine and vehicle parameters. A storage device 110 and a local display device 112 are each connected to the programmable logic device 106. The apparatus 100 also includes a time base 114 associated with the programmable logic device 106 and a data transmission device 116 likewise associated with the logic device 106.

The parameter signals produced by the transducers 108 are received by the programmable logic device 106 and controllably manipulated to produce first and second predetermined sets of information signals. The first predetermined set of information signals is delivered to the storage device and each signal is individually accumulated in the storage device 110 during a first predetermined period. Preselected ones of the second predetermined set of information signals are controllably delivered to the local display device 112. The parameter signals and the first predetermined set of information signals are optionally further selectively and controllably manipulated by the logic device 106 to produce a third predetermined set of information signals. The third set of information signals is delivered to the storage device 110 and each signal is individually accumulated in the storage device 110 during a second predetermined period which is a subset of and shorter than the first predetermined period.

Figure 2:
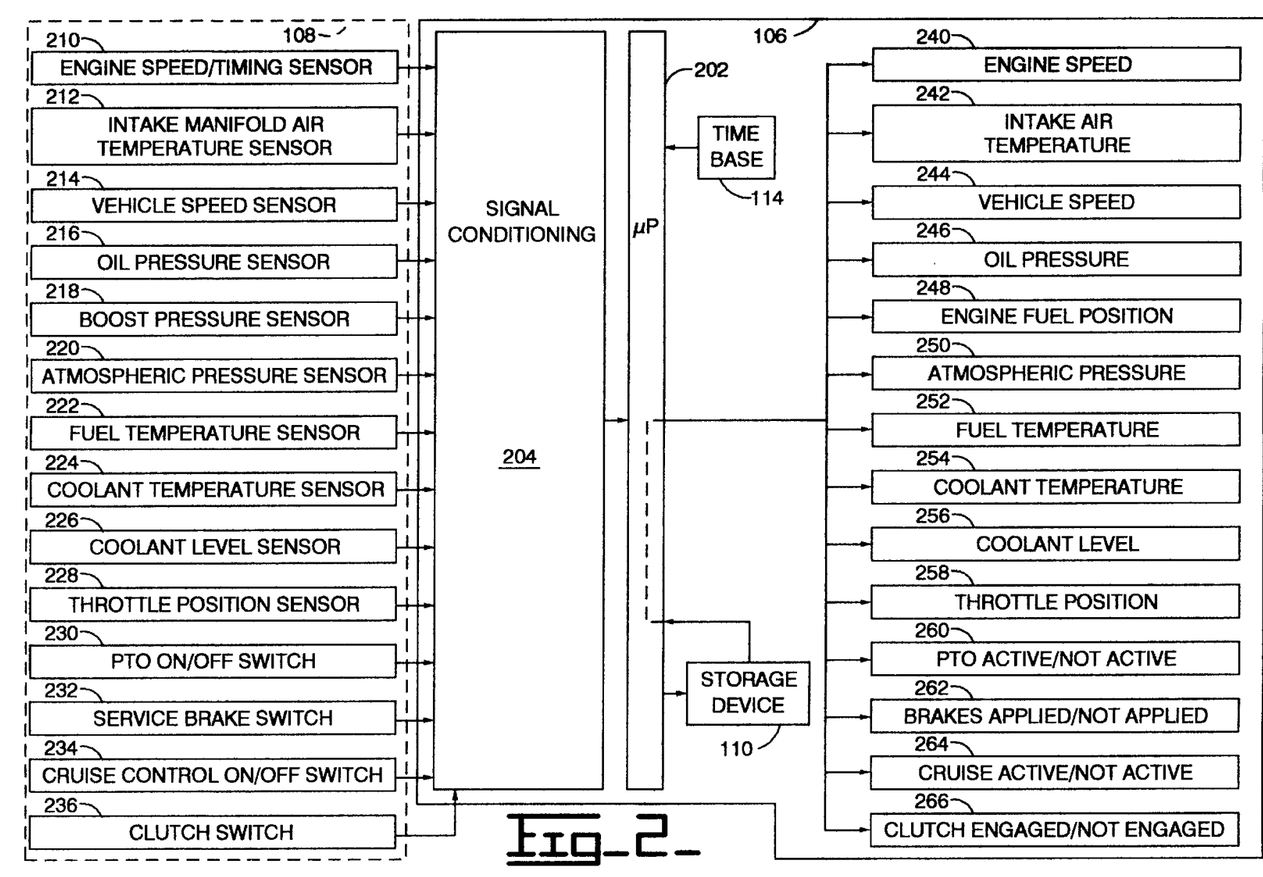
FIG. 2 is a more detailed block diagram of a logic device and a plurality of sensors associated with one embodiment of the present invention.

In FIG. 2, a more detailed view of some of the elements shown in FIG. 1 is set forth. FIG. 2 illustrates the programmable logic device 106 including a microprocessor 202, and the plurality of signal conditioning elements 204 associated with the processor 202. The plurality of transducers 108 are connected to the logic device 106 through the signal conditioning element 204. In a preferred embodiment of the apparatus 100, the transducers 108 include the following individual elements: engine speed/timing sensor 210, intake manifold air temperature sensor 212, vehicle speed sensor 214, oil pressure sensor 216, boost pressure sensor 218, atmospheric pressure sensor 220, fuel temperature sensor 222, coolant temperature sensor 224, coolant level sensor 226, throttle position sensor 228, PTO on/off switch 230, service brake switch 232, cruise control on/off switch 234, and clutch switch 236.

The parameter signals produced by the plurality of transducers 108 are processed by the microprocessor 202 to produce responsive information signals. In a preferred embodiment of the present invention, the information signals responsive to the sensors 210–236 include engine speed 240, intake air temperature 242, vehicle speed 244, oil pressure 246, engine fuel position 248, atmospheric pressure 250, fuel temperature 252, coolant temperature 254, coolant level 256, throttle position 258, PTO active/not active 260, brakes applied/not applied 262, cruise active/not active 264, and clutch engaged/not engaged 266.

The storage device 110 is connected to the microprocessor 202 of the programmable logic device 106. In the preferred embodiment, the storage device 110 is a form of random access memory. In a preferred embodiment of the apparatus 100, the random access memory can include both volatile and non-volatile memory elements enabling it to store both transitional and static data.

Referring again to FIG. 1, the local display device 112 includes a control portion 118 having at least one manually operable control switch connected to the programmable logic device 106 in a manner sufficient to select which of the information signals is displayed on the local display device 112. Also, the data transmission device 116 is connected through a communication port 120 to the programmable logic device 106. The data transmission device 116 is of common design and is sufficient to deliver selected ones of the information signals to a remote location. For example, the data transmission device could be a radio radiating standard radio signals, or a microwave, infrared, or other type transmission device, and can include satellite link capability. Various types of data transmission devices are well known in the art of communicating signals to remote locations and any suitable device is anticipated to be useable with the apparatus 100.

Also, in a preferred embodiment of the apparatus 100, access to and manipulation of or removal of the information signals accumulated in the storage device 110 is controllably restricted utilizing one or more levels of password protection. Again, the use of password protection for restricting access to data elements in a computerized system is well known in the art.

FIGS. 3–13 are flowcharts illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program, and have been reduced to practice on a microcomputer system. The software program may be readily coded from these detailed flowcharts using the instruction set associated with any suitable conventional microcomputer. The process of writing software code from flowcharts such as these is a mere mechanical step for one skilled in the art.

The apparatus 100 is intended to provide several different views of the information signals associated with the parameter signals of the vehicle 102 and associated engine 104. For example, from the manufacturer's point of view, a look at various parameters over the lifetime of the engine or vehicle is of most interest. From the fleet manager's point of view, the time of interest may be a single trip or set of related trips, while the operator might be most interested in the instantaneous characteristics of the vehicle and engine. The apparatus 110 is flexible enough to accumulate and provide information suitable for each of these different users.

Figure 3:
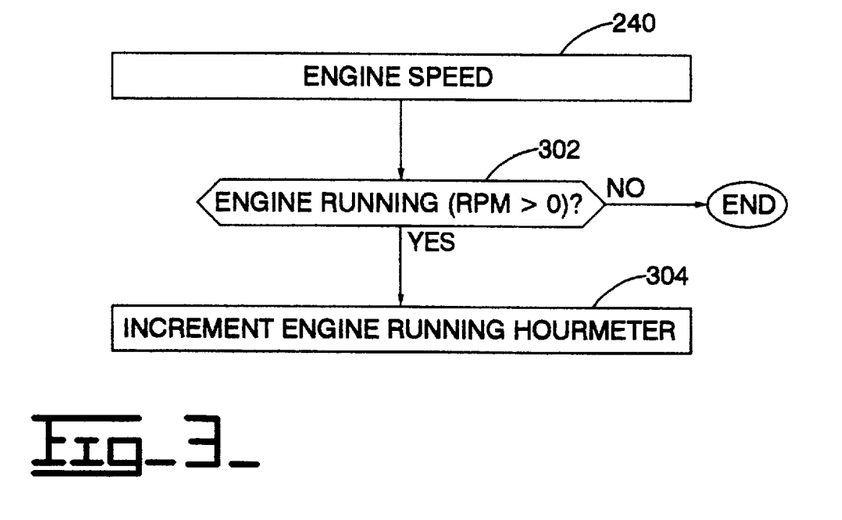
FIGS. 3–13 are elements of a flowchart of software used with the described embodiment of the present invention.

The first set of flowcharts illustrates the logic utilized by the programmable logic device 106 to accumulate information signals relating to the operational characteristics of the vehicle 102 and associated engine 104. In FIG. 3 the engine speed sensor 210 delivers a signal relating to engine RPM from the block 240 to block 302 of the flowchart. If the RPM is not greater than zero or if the engine is not running this module ends. If the engine RPM is greater than zero the amount of time that that condition is present is accumulated in the storage device 110 by incrementing an associated hourmeter register in the block 304.

Figure 4:
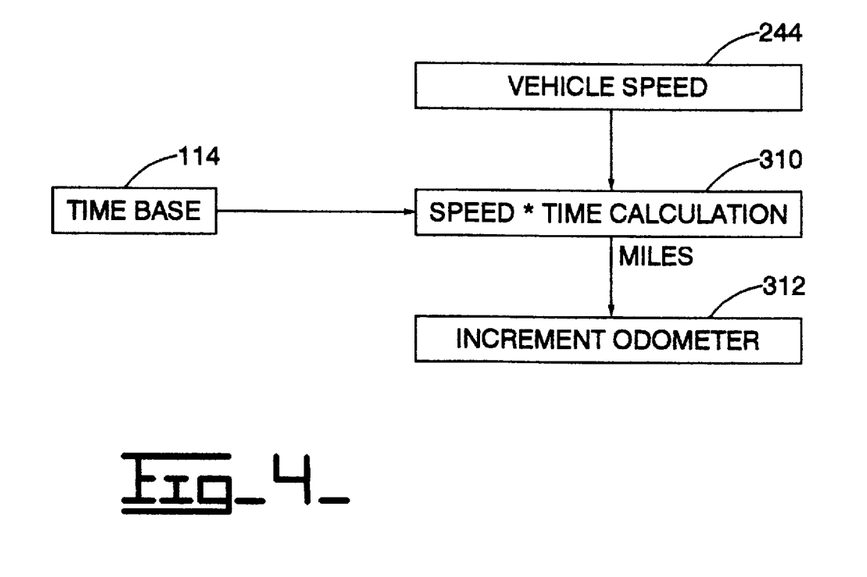

Accumulated vehicle miles are dealt with in the next module at FIG. 4. Vehicle speed from the vehicle speed sensor 214 is delivered from the block 244 to the program logic at the block 310, along with a time signal from the time base 114. A speed versus time calculation is performed resulting in miles traveled by the vehicle 102. The total miles are accumulated in the storage device 110 by incrementing an odometer register at the block 312.

Figure 5:
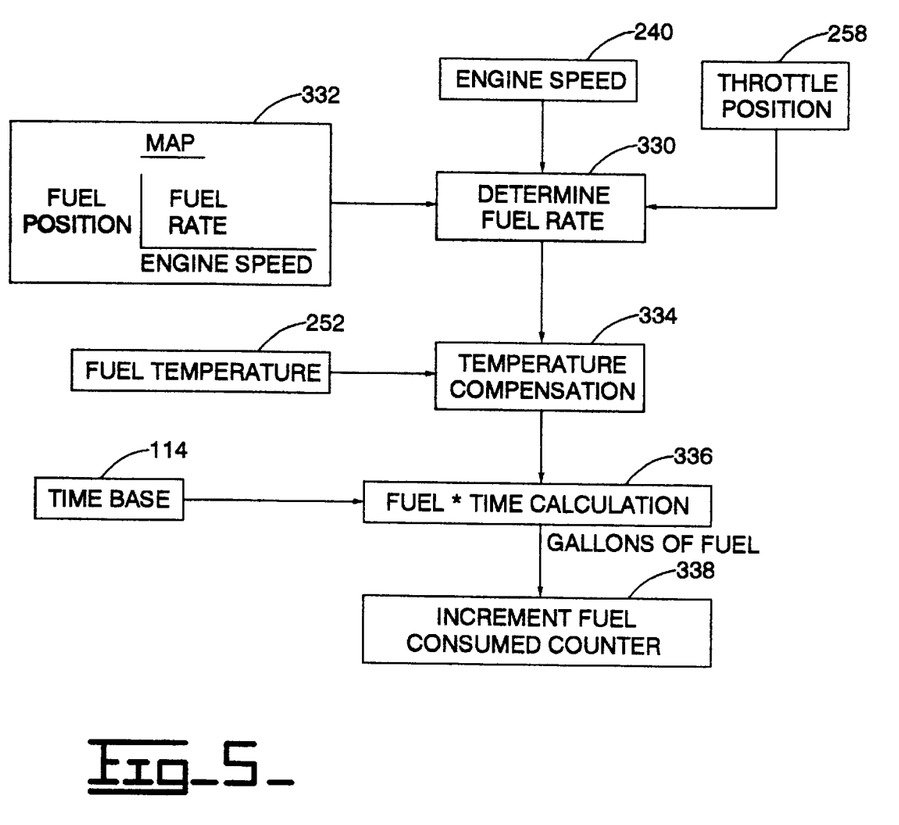

Fuel consumed is another desired information signal that is dealt with in FIG. 5. Inputs to this flowchart are the engine speed from the block 240 and engine fuel position from the throttle position block 258. Each of these is delivered to the block 330 in which fuel rate is determined by utilizing a look up map 332, which maps engine speed against fuel position and plots the resulting fuel rate. The fuel rate signal is then delivered to the block 334 where a fuel temperature correction or compensation is conducted by utilizing the fuel temperature signal from the block 252. The corrected fuel rate is then delivered to the block 336 where it is multiplied by the time from the time base 114 to produce gallons of fuel consumed. This information signal is delivered to the storage device 110 at the block 338 where the fuel consumed register is incremented.

Figure 6:
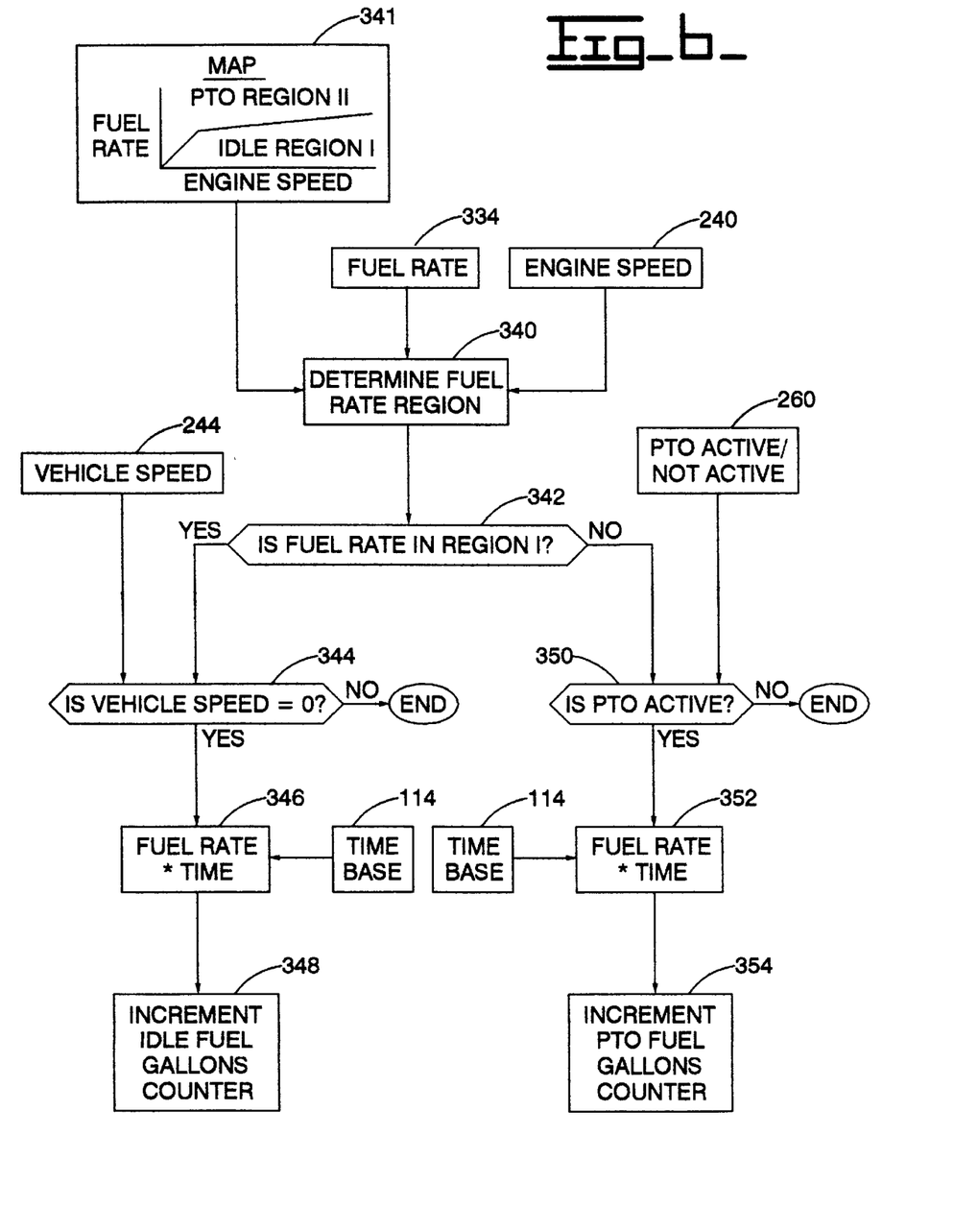

In FIG. 6 the amount of time that the vehicle and engine spends either idling or in the power take-off mode are both of interest and concern to engine owners and manufacturers. In this module, the fuel rate delivered from the block 334 and the engine speed from the block 240 are used as inputs to the block 340, which utilizes a map of fuel rate and engine speed to determine whether the fuel rate to be accumulated is in the idle or power take-off region.

According to this map, if the fuel rate is in the idle or region I area and the engine speed is zero then the engine must be in the idle mode, regardless of the position of the power take-off switch as sensed by the power take-off transducer 230. On the other hand, if the fuel rate is in the power take-off region II and the power take-off switch 230 is on, the engine is truly in the power take-off mode and the fuel consumed should be allocated to the power take-off activity.

The result of this test is delivered to the block 342, which asks if the fuel rate is in region I. If the answer is yes, program control transfers to the block 344 to determine whether the vehicle speed is equal to zero. Vehicle speed is determined from the signal at the block 244 which is delivered to the block 344. If the vehicle speed is not equal to zero, the program ends. Assuming that vehicle speed is equal to zero, the program goes to the block 346 where the fuel rate is multiplied by time from the time base 114, producing gallons of fuel utilized in idling and accumulated in the storage device 110 at the block 348.

On the other hand, if the fuel rate at the block 342 is found not to be in region I then it must be determined if the power take-off is active. This is done in the block 350. If the power take-off signal at the block 260 indicates that the power take-off is not active then the program ends. However, if the power take-off is active the program progresses to the block 352 where the fuel rate is multiplied by time from the time base 114, producing gallons of fuel in the power take-off mode. This result is stored in the storage device 110 at the block 354.

Figure 7:
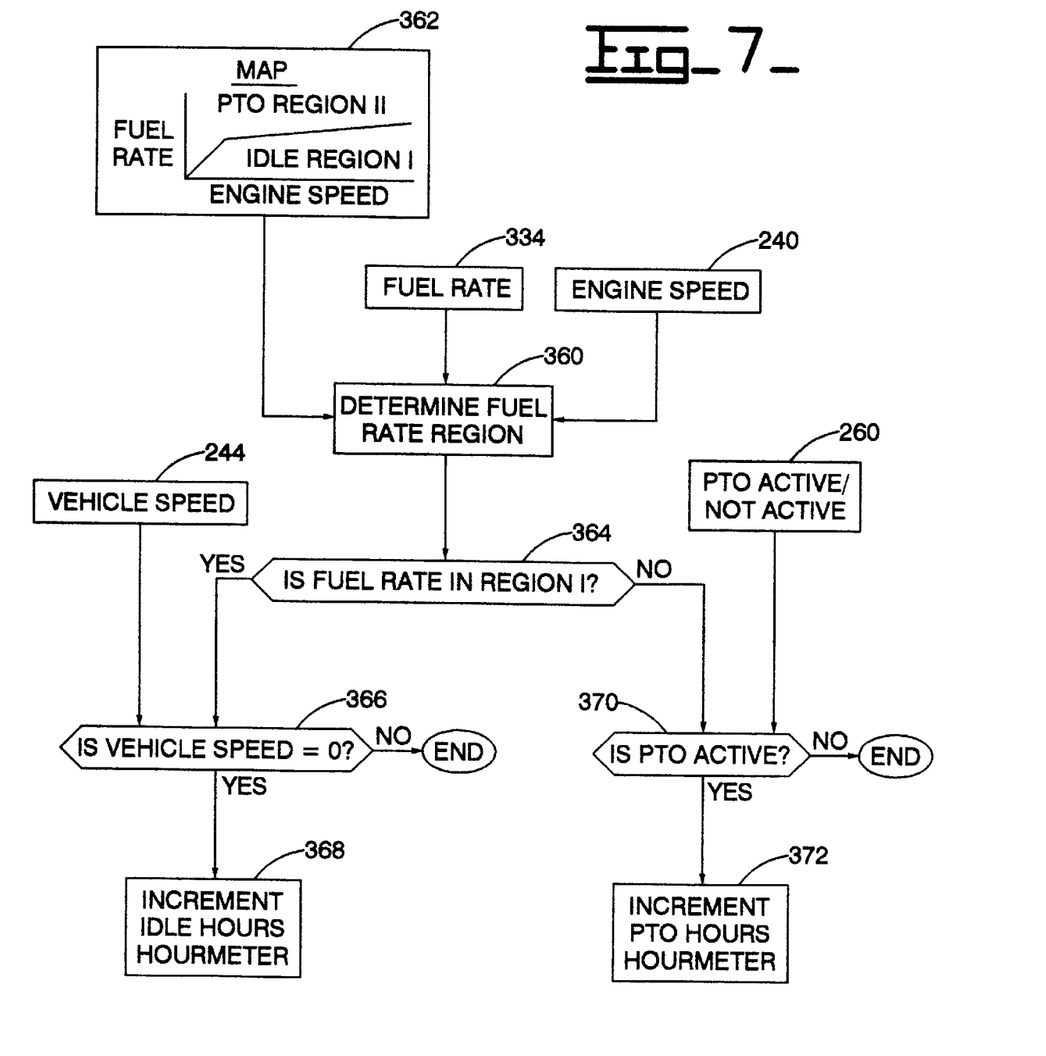

Next, in FIG. 7, similar to the preceding module, idle and PTO hours are also of interest. This determination is made in a way similar to the idle and PTO fuel consumed determination. First, the fuel rate from the block 334 and engine speed from the signal block 240 are delivered to the block 360 which determines the idle and PTO regions as discussed above from a map 362. The result of this determination is delivered to the block 364, and if the fuel rate is found to be in the idle region I control progress is to the block 366 where the vehicle speed from the signal at the block 244 is tested to determine if the vehicle speed is equal to zero. If not, the program ends.

Assuming that the vehicle speed is zero, the amount of time that the engine spends in this mode is accumulated in the storage device 110 at the block 368. If the fuel rate was not in region I at the block 364, the test is made in the block 370 to determine whether the power take-off switch is activated. This is determined using the power take-off signals at the block 260. If not, the program ends. Assuming that the power take-off switch 230 was active, the amount of time that the engine spends in this mode is accumulated in the storage device 110 at the block 372.

Figure 8:
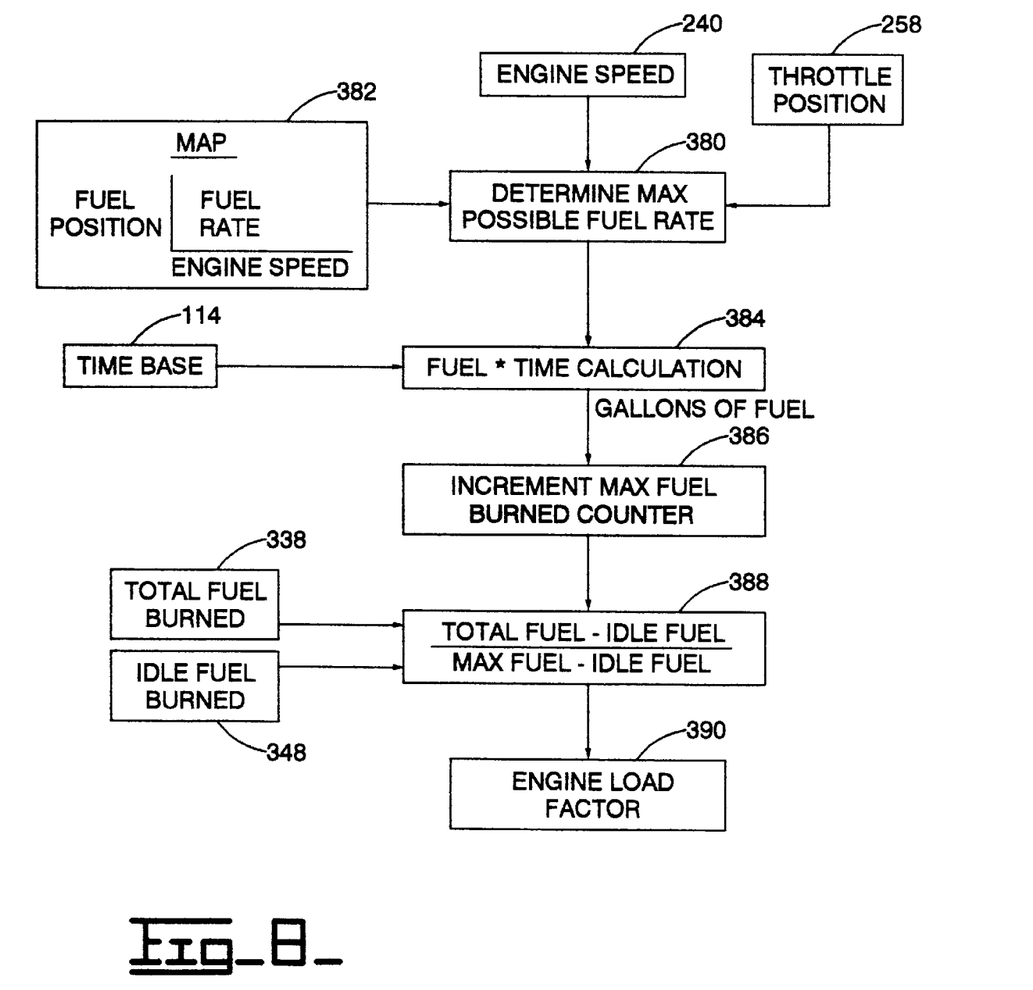

FIG. 8 describes a module for determining the engine load factor. The average engine load factor is equal to the total fuel consumed minus the amount of fuel consumed while idling, divided by the maximum fuel that would have been burned if the engine ran at its rated fuel position all of the time less the amount of fuel spent idling.

The module begins at the block 380, where engine RPM from the signal at the block 240 and throttle position from the signal at the block 258 are used in conjunction with a map at the block 382 to determine the maximum possible fuel rate. This information is delivered to the block 384 where it is multiplied by time from the time base 110 to produce gallons of fuel consumed. This information is delivered to the block 386 where the maximum fuel consumed register in the storage device 110 is incremented, and is then delivered to the block 388 where the calculation described in the above paragraph takes place, using information relating to the total fuel burned from the block 338 and the idle fuel burned from the block 348. The result of this calculation is delivered to the storage device 110 at the block 390 as the average engine load factor.

Figure 9:
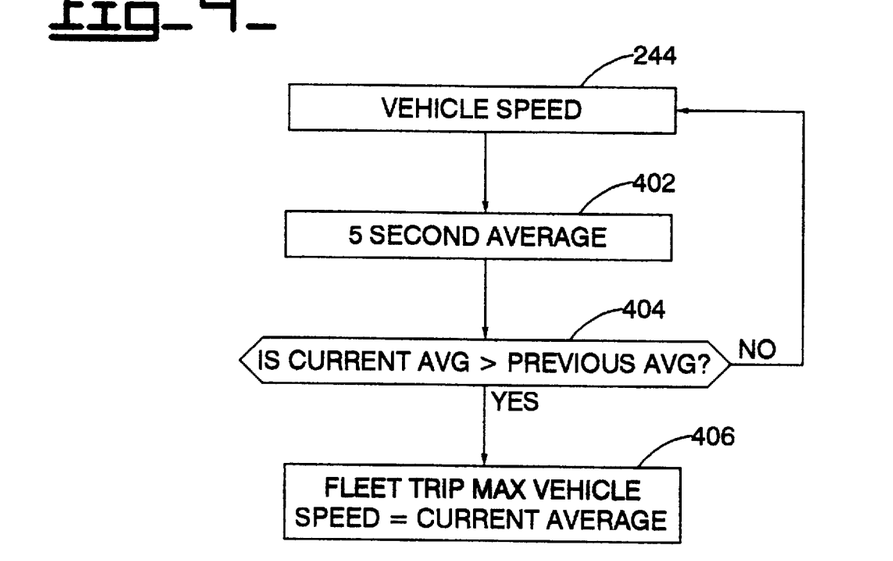

FIG. 9 is a module for keeping track of the maximum vehicle speed during a particular trip or period of time. Vehicle speed from the signal at the block 234 is delivered to the block 402 where the signal is averaged for a period of time, for example, five seconds. This averaged or "debounced" vehicle speed is then delivered to the block 404 to determine whether it is greater than the most recent maximum average vehicle speed. If not, the program moves back to the block 244 where the process repeats. Assuming that the new vehicle speed is greater than the previous maximum average vehicle speed, the new speed is delivered to the block 406 where it is stored in the logic device 110 as the new maximum average vehicle speed.

Figure 10:
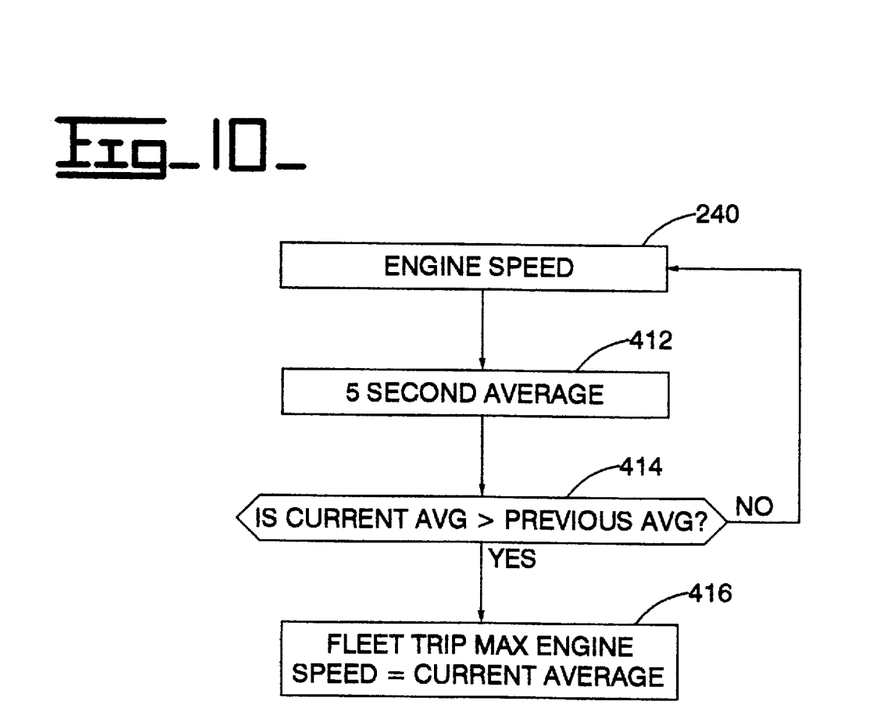

In a like manner, at FIG. 10, the maximum engine speed is determined and recorded. The actual instantaneous engine speed is delivered from the signal at the block 240 to the block 412 where an average, for example, a five second average, is taken, and the average signal is delivered to the block 414. If the most recent average engine speed is not greater than the presently stored maximum engine speed the program loops back to the block 240. However, if the present average vehicle speed is greater than that previously stored, the program proceeds to the block 416 where the maximum engine speed is updated to the current value in the storage device 110.

Figure 11:
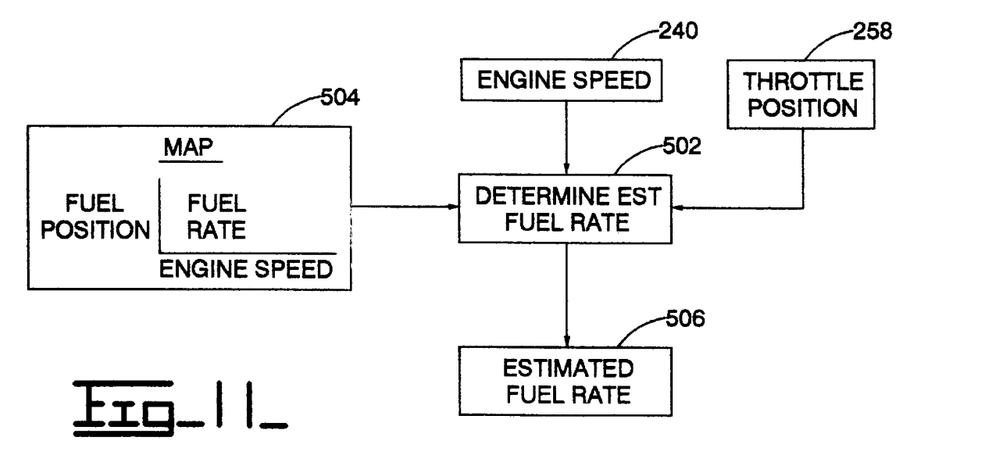
Figure 12:
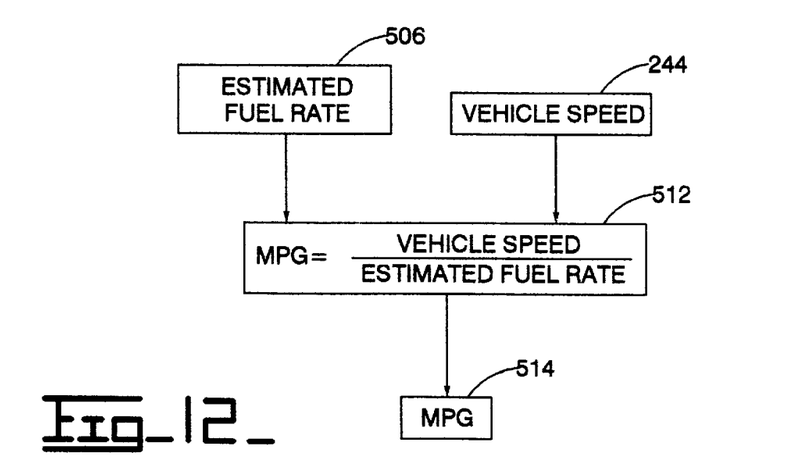
Figure 13:
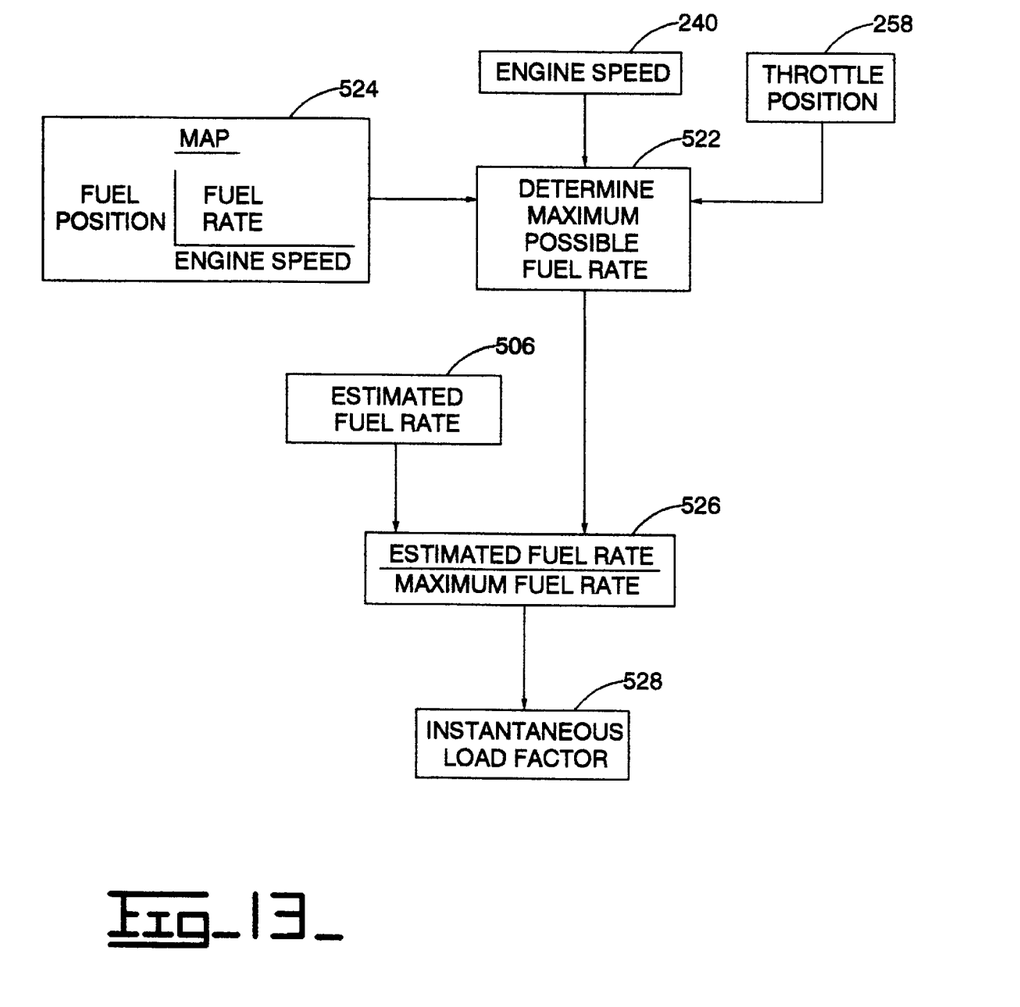

FIGS. 11 to 13 illustrate the ability to determine and display instantaneously information relating to vehicle and engine characteristics. Of course, any of the signals developed at the blocks 240–266 can be stored in the storage device 110, delivered to the display device 112 which can be a local dashboard display or a custom device plugged into the programmable logic device 106, or delivered to the data transmission device 116 for delivery to a remote location. In the case of the local display situation, the operator of the vehicle is likely to be interested in such things as the engine speed at the block 240, the vehicle speed at the block 244, and other performance indications such as the rate of fuel consumption, the miles per gallon, or the engine load factor. The calculations required for these last three information signals are depicted in the final flowcharts.

FIG. 11 shows the block 502 receiving an engine RPM signal from the block 240 and a fuel throttle position signal from the block 258. These signals are used to look up information in a map 504 from which an estimated fuel rate can be produced. This estimated fuel rate can then be delivered to the display device 112 or otherwise handled as described above.

In a like manner, FIG. 12 shows the estimated fuel rate from the block 506 and vehicle speed from the block 244 delivered to the block 512. Miles per gallon are calculated by dividing the speed by the fuel rate, and are delivered to the block 514, from which it can be delivered appropriately.

Instantaneous load factor calculation is shown in FIG. 13. Engine RPM from the block 240 and throttle position from the block 258 are delivered to the block 522, where the map at the block 524 is interrogated to determine a maximum possible fuel rate for the specified engine. This signal, along with the estimated fuel rate from the block 506, is delivered to the block 526, where the instantaneous load factor is calculated by dividing the estimated fuel rate by the maximum possible fuel rate. The instantaneous load factor at the block 528 is then displayed on the display device 112 or handled as otherwise described above.

Industrial Applicability

The above description of the apparatus 10 illustrates a preferred embodiment for a flexible data recording and display system that permits owners, operators, service technicians, and manufacturers of vehicles and engines to sense and preserve information relating to those devices and to either observe those instantaneously on a local display device or at some later time, either on the local display device or by utilizing a module such as a service tool or microcomputer for interrogation and display purposes. Typically, a large amount of information relating to vehicle and engine operating characteristics will be recorded but only some of that information will be needed by any particular interested party.

The apparatus 100 preferably includes one or more various modes specifically tailored for each such interested party. For example, an embodiment of the apparatus 100 includes a cumulative mode wherein the parameter signals are received by the programmable logic device 106 and are controllably manipulated by the logic device 106 to produce first information signals that are delivered to the storage device 110 and are individually accumulated in the storage device 110 during a first predetermined period. This cumulative mode would be the mode of most interest to the manufacturer who is interested in long term cumulative information relating to the engine and vehicle. This information is most logically reset or recalibrated only when the engine is first manufactured or when a major repair or rebuilt is made to the engine or vehicle. The cumulative information is preferably stored in non-volatile memory and is difficult to remove or destroy. A high level of password protection is one mechanism for preserving the integrity of such information.

The apparatus 100 also preferably includes an instantaneous mode wherein the parameter signals are received by the logic device 106 and are controllably manipulated by the logic device 106 to produce second information signals that are controllably delivered to the display device 112. This instantaneous information is of most interest to the operator of a vehicle or to service personnel in the process of trouble shooting the vehicle or engine.

An intermittent mode is also preferably included wherein the parameter signals and the first predetermined set of information signals are optionally further selectively and controllably manipulated by the logic device 106 to produce a third predetermined set of information signals that are delivered to the storage device 110, and are individually accumulated in the storage device 110 during a second predetermined period which is a subset of the first predetermined period. This intermittent mode is of most use to a fleet manager who is interested in tracking certain information relating to vehicle and engine characteristics during a particular trip or set of related trips to gather fleet operation type information.

Other aspects, objects, advantages of this uses can be obtained from a study of the drawings, the disclosure, and the appended claims.

We claim:

1. An apparatus to controllably sense, record, and selectively display data associated with operational characteristics of a vehicle and associated engine, comprising:

a programmable logic device;

a plurality of transducers respectively connectable to said programmable logic device and each adapted to produce parameter signals responsive to respective preselected engine and vehicle parameters;

a storage device connected to said programmable logic device;

a local display device connectable to said programmable logic device; and, wherein said parameter signals are received by said programmable logic device and controllably manipulated by said programmable logic device to produce first and second predetermined sets of information signals, said first predetermined set of information signals being delivered to said storage device and individually accumulated in said storage device during a first predetermined period, and preselected ones of said second predetermined set of information signals being controllably delivered to said local display device; and, wherein said parameter signals and said first predetermined set of information signals are optionally further selectively and controllably manipulated by said programmable logic device to produce a third predetermined set of information signals, said third predetermined set of information signals being delivered to said storage device and individually accumulated in said storage device during a second predetermined period, said second predetermined period being a subset of said first predetermined period.

2. An apparatus, as set forth in claim 1, wherein said storage device includes both volatile and non-volatile dynamic memory.

3. An apparatus, as set forth in claim 1, wherein said local display device includes a control portion having at least one manually operable control switch connected to said programmable logic device in a manner sufficient to select which of said information signals is displayed on said local display device.

4. An apparatus, as set forth in claim 1, wherein said programmable logic device includes a communication port and including a data transmission device connected to said communication port, said data transmission device being sufficient to deliver selected ones of said information signals to a remote location.

5. An apparatus, as set forth in claim 1, wherein access to and removal of the accumulated information signals stored in said storage device is controllably restricted using one or more levels of password protection.

6. An apparatus to controllably sense, record, and selectively display data associated with operational characteristics of a vehicle and associated engine in accordance with a plurality of selectable operating modes, comprising:

a programmable logic device;

a plurality of transducers respectively connectable to said programmable logic device and each adapted to produce parameter signals responsive to respective preselected engine and vehicle parameters;

a storage device connected to said programmable logic device;

a local display device connectable to said programmable logic device; and, wherein said plurality of selectable operating modes include:

a cumulative mode wherein said parameter signals are received by said programmable logic device and are controllably manipulated by said programmable logic device to produce first information signals that are delivered to said storage device and individually accumulated in said storage device during a first predetermined period;

an instantaneous mode wherein said parameter signals are received by said programmable logic device and are controllably manipulated by said programmable logic device to produce second information signals that are controllably delivered to said local display device; and, an intermittent mode wherein said parameter signals and said first predetermined set of information signals are optionally further selectively and controllably manipulated by said programmable logic device to produce a third predetermined set of information signals that are delivered to said storage device and individually accumulated in said storage device during a second predetermined period, said second predetermined period being a subset of said first predetermined period.

7. A method for controllably sensing, recording, and selectively displaying data associated with operational characteristics of a vehicle and associated engine having a plurality of transducers respectively connectable to a programmable logic device and adapted to produce parameter signals in response to respective preselected engine and vehicle parameters, and having a storage device connected to said programmable logic device and a local display device connectable to said programmable logic device, comprising the steps of:

controllably manipulating said parameter signals to produce first and second predetermined sets of information signals;

delivering said first predetermined set of information signals to said storage device and individually accumulating said first predetermined set of information signals in said storage device during a first predetermined period;

controllably delivering preselected ones of said second predetermined set of information signals to said local display device;

selectively and controllably manipulating said parameter signals and said first predetermined set of information signals to produce a third predetermined set of information signals; and, delivering said third predetermined set of information signals to said storage device and individually accumulating said third predetermined set of information signals in said storage device during a second predetermined period, said second predetermined period being a subset of said first predetermined period.

* * * * *